Figure 1:
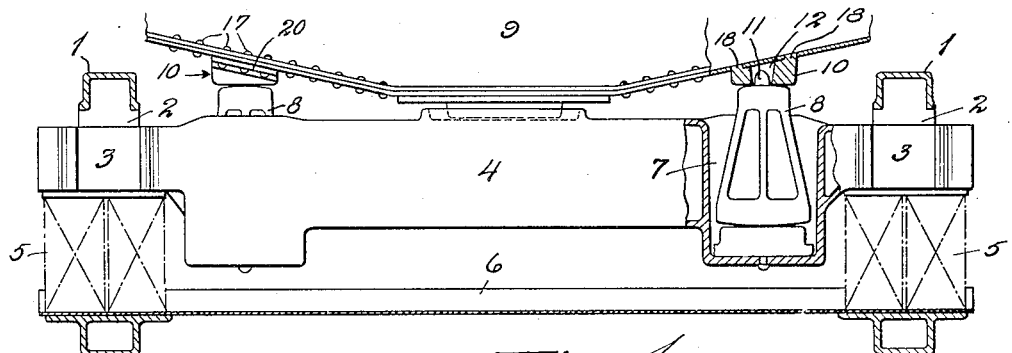

June 14, 1932. M. H. MARTIN 1,863,121

DEPENDING BEARING ELEMENT MOUNTING

Filed June 6, 1928

Inventor
Mark H. Martin
By
his Attorney

Patented June 14, 1932

1,863,121

UNITED STATES PATENT OFFICE

MARK H. MARTIN, OF BALTIMORE, MARYLAND, ASSIGNOR TO T. H. SYMINGTON & SON, INC., OF BALTIMORE, MARYLAND, A CORPORATION OF MARYLAND

DEPENDING BEARING ELEMENT MOUNTING

Application filed June 6, 1928. Serial No. 283,382.

The invention relates to railway car trucks and has special reference to that type in which the truck bolster carries rockers mounted for substantially universal movement and coacting with depending side bearing elements carried by the body bolster.

The general structure of the above mentioned type of truck is disclosed in the co-pending applications of T. H. Symington, filed April 5th, 1927, Serial No. 181,161, March 22nd, 1927, Serial No. 177,288, March 22nd, 1927, Serial No. 177,287, and the co-pending applications of P. R. Drenning, filed March 22nd, 1927, Serial No. 177,340, November 12th, 1927, Serial No. 232,859. In all of said applications there is disclosed a structure in which the truck bolster is formed with pockets within which are located rockers provided at their upper ends with spuds received within openings in bearing elements depending from the body bolster. As particularly well illustrated in application Serial No. 181,161, filed April 5th, 1927, the depending bearing element on the body bolster is provided with outstanding ears riveted to the underside of the body bolster so as to effect the necessary securing action. Owing to the wear on the depending bearing element it has been found necessary to harden it by one of the well known heat treatment methods. The result is that the ears become brittle so that great care must be exercised in riveting them onto the bolster to avoid breaking.

It is with the above facts in view that I have devised the present invention which has for its general object the provision of a method of securing the depending bearing element in place on the body bolster without the employment of securing elements passing through any such apertured ears as are above referred to.

Another object of the invention is to provide a species of clamp or clip means for securing the depending bearing element in place.

An important object of the invention is the provision of means formed on the depending bearing element and coacting with the body bolster for taking the outward end thrust and thereby preventing any shifting of the bearing element longitudinally of the bolster.

An additional object of the invention is to provide a structure or mounting of this character which will be simple and inexpensive, easy to assemble or install, positive in action, efficient and durable in service, and a general improvement in the art.

Figure 2:
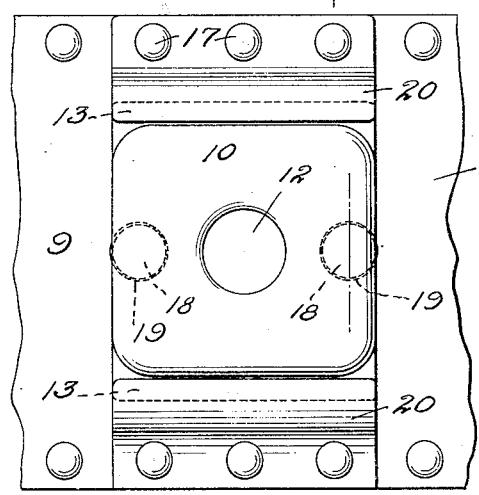
Figure 3:
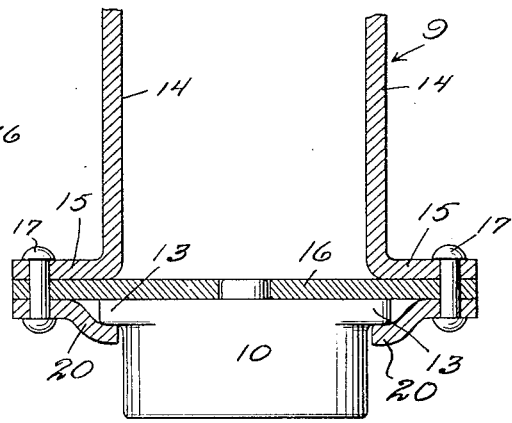
Figure 4:
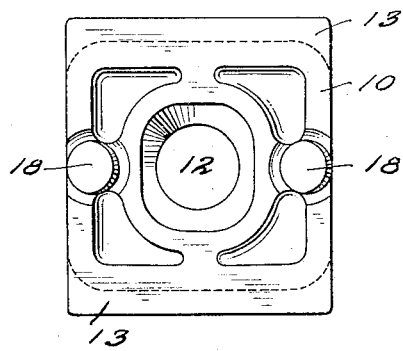
Figure 5:
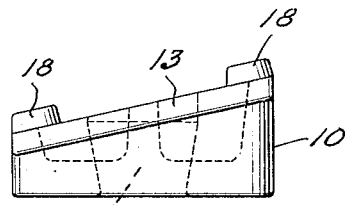

To the attainment of the foregoing and other objects and advantages, the invention preferably consists in the details of construction and the arrangement and combination of parts to be hereinafter more fully described and claimed, and illustrated in the accompanying drawing in which:

Figure 1 is a view partly in elevation and partly in section showing a truck bolster equipped with a side bearing rocker coacting with a depending bearing element mounted on the body bolster in accordance with the invention, Figure 2 is a bottom plan view of the body bolster with the bearing element in place, Figure 3 is a cross sectional view taken on the line 3—3 of Figure 2, Figure 4 is a top plan view of the bearing element, Figure 5 is a side view of the bearing element.

Referring more particularly to the drawing the numeral 1 designates the side frame of a truck, this side frame having the usual window opening 2 through which extends an extension 3 on the end of the truck bolster 4, the usual or any preferred spring nest indicated diagrammatically at 5 being interposed between the extension 3 and the spring plank 6. The truck bolster 4 is represented as having a pocket 7 within which is mounted a rocker 8 capable of having substantial universal movement. The body bolster is designated by the numeral 9 and carries a depending bearing element indicated generally at 10 coacting with the rocker 8. To maintain the rocker in proper relation to the depending bearing element at all times, the rocker is shown as having a spud 11 on its upper end received within an opening 12 in the bearing element 10. It has ordinarily been the practice to provide the bearing element 10 with outstanding ears riveted to the body bolster and it is the purpose of the present invention to provide the different securing means to be described in detail.

The bearing element 10 is preferably of generally rectangular shape with rounded corners and edges and in actual practice may very conveniently be formed as a casting. Whether this member be of ribbed or webbed construction as shown or whether it be formed as a solid block with the aperture 12 therein is immaterial though the former construction is naturally lighter in weight without sacrificing strength. At its opposite sides the member 10 is provided with outward extensions preferably in the nature of flanges 13 which may or may not be coextensive with the width of the member, this being a small detail. As is well known, the body bolster comprises channeled sides 14 having outward directed flanges 15 to which are riveted the top and bottom plates 16, the rivets themselves being indicated at 17, these rivets extending in rows spaced inwardly from the edges but outwardly of the bearing member 10 as clearly indicated in Figure 2, and in accordance with the present invention I make use of certain of these rivets for holding the bearing member in place as will be described.

In order that the bearing member 10 will be located at the proper point or position and in order to prevent it from having any movement longitudinally of the body bolster, it is shown as formed at its top with a plurality of lugs 18 received within corresponding holes or openings 19 in the bottom plate 16 of the body bolster. These lugs are preferably so shaped that one face of each will be at right angles to the bottom plate of the bolster to abut flatly against the wall of the opening for taking the end thrust which occurs in service. These lugs are intended to be of sufficient size to withstand the shearing strains to which they are naturally subjected though actually they need not be of any great diameter. Clearly the lugs might be of some other shape than the frusto-conical one illustrated though this is very desirable especially as drawing of the pattern after molding is facilitated. To retain the bearing member against the body bolster I may provide a pair of clips or clamps 20 formed preferably of springy material and so positioned on the underside of the body bolster as to engage beneath the flanges 13. These plates 20 are provided with holes for the passage of certain of the rivets 17 so that the bearing retaining clips or clamps will be held in place by the same means provided for holding the bottom plate of the bolster.

From the foregoing description and a study of the drawing it will be apparent that I have thus provided a very simple method of mounting the depending bearing element on the body bolster, the construction being characterized by the absence of any necessity for forming rivet receiving holes in any part. The bearing member may consequently be made as hard as desired, by the usual heat treatment, and may be easily secured in place without danger of breaking off any ears, flanges or the like. In other words even though the laterally projecting flanges may be very brittle there is no danger of their breaking as they are simply clampingly engaged by the clip plates. The end thrust caused by the coaction of the depending bearing element with the side bearing rocker is well taken care of the lugs which extend through the bottom plate of the body bolster so that the only work performed by the rivets which pass through the clip plates is to hold the bearing against vertical displacement. It is believed that the construction and advantages will be readily apparent from the foregoing without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck, a body bolster, a truck bolster, a side bearing rocker carried by each end portion of the truck bolster, a depending bearing element on the underside of the body bolster for coaction with said rocker, and clip means for securing said depending bearing element in position.

2. In a railway car truck, a body bolster, a truck bolster, a side bearing rocker carried by each end portion of the truck bolster, a depending bearing element on the underside of the body bolster for coaction with said rocker, clamp means for securing said depending bearing element in position, and means carried by the depending bearing element and coacting with the body bolster for taking the endwise thrust caused by coaction of the depending bearing element with the rocker.

3. In a railway car truck, a truck bolster having each end provided with a side bearing rocker having an upstanding spud thereon, a body bolster having a bottom plate, a depending bearing element on the underside of the body bolster apertured for the reception of said spud, means for clamping said depending bearing element upon the bottom plate comprising outstanding flanges on the depending bearing element, and clip plates secured to the bottom plate and engaging beneath said flanges.

4. In a railway car truck, a body bolster having a bottom plate, a depending bearing element on the underside of the body bolster, means for clamping said depending bearing element upon the bottom plate comprising outstanding flanges on the depending bearing element, and clip plates secured to the bottom plate and engaging beneath said flanges, the bottom plate having openings therein, and said depending bearing element having projections fitting within said openings for taking lateral thrusts.

5. In a body bolster including channeled sides and a bottom plate secured thereto by rivets, a bearing element on the underside of the bottom plate having lateral projections, and clip plates secured on the underside of the bottom plate by said rivets and engaging beneath said lateral projections.

6. In a body bolster including channeled sides and top and bottom plates, means securing the bottom plate to the sides, a bearing element on the underside of the bottom plate having lateral projections, and clip plates secured on the underside of the bottom plate by said securing means and engaging beneath said lateral projections, the bottom plate having openings therein and lugs on the top of the bearing element fitting within said openings.

7. Means for securing a depending bearing element on the underside of a body bolster, the bearing element having imperforate lateral flanges; comprising clip plates disposed flat against the underside of the bolster and having downwardly offset portions extending beneath said flanges, and means for securing said clip plates upon the bolster.

In testimony whereof I affix my signature.

MARK H. MARTIN.